March 1, 1932.  W. F. COLEMAN  1,847,752
HOT CAKE MACHINE
Filed July 23, 1928   3 Sheets-Sheet 3
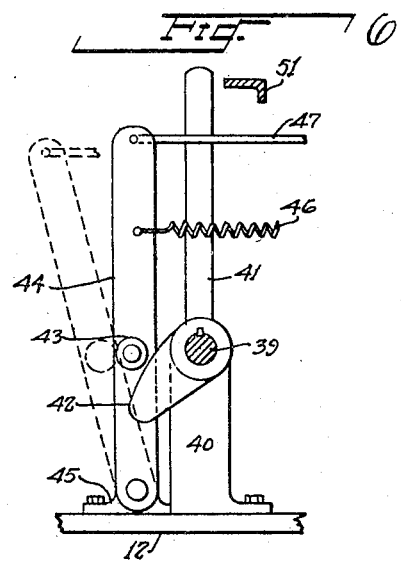
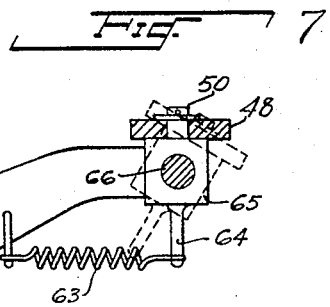
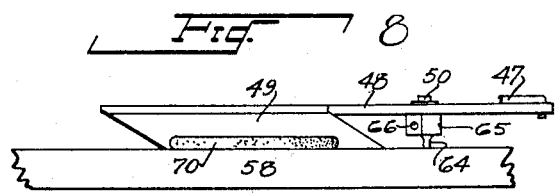
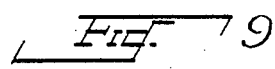
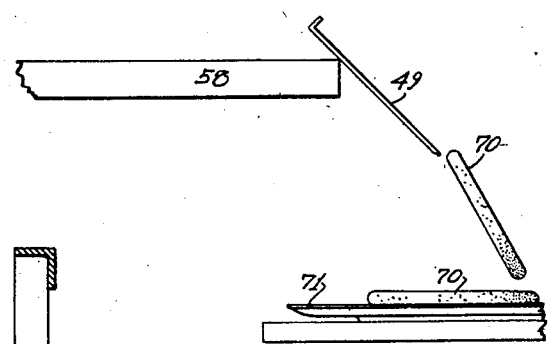
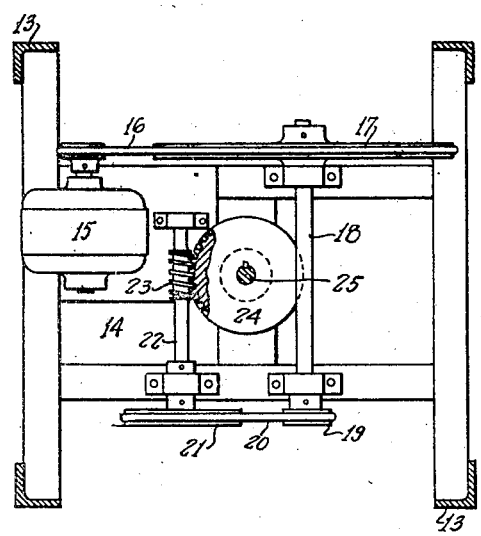
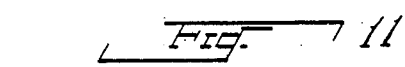
INVENTOR
W. F. Coleman
BY C. B. Birkenbeuel.
ATTORNEY Patented Mar. 1, 1932

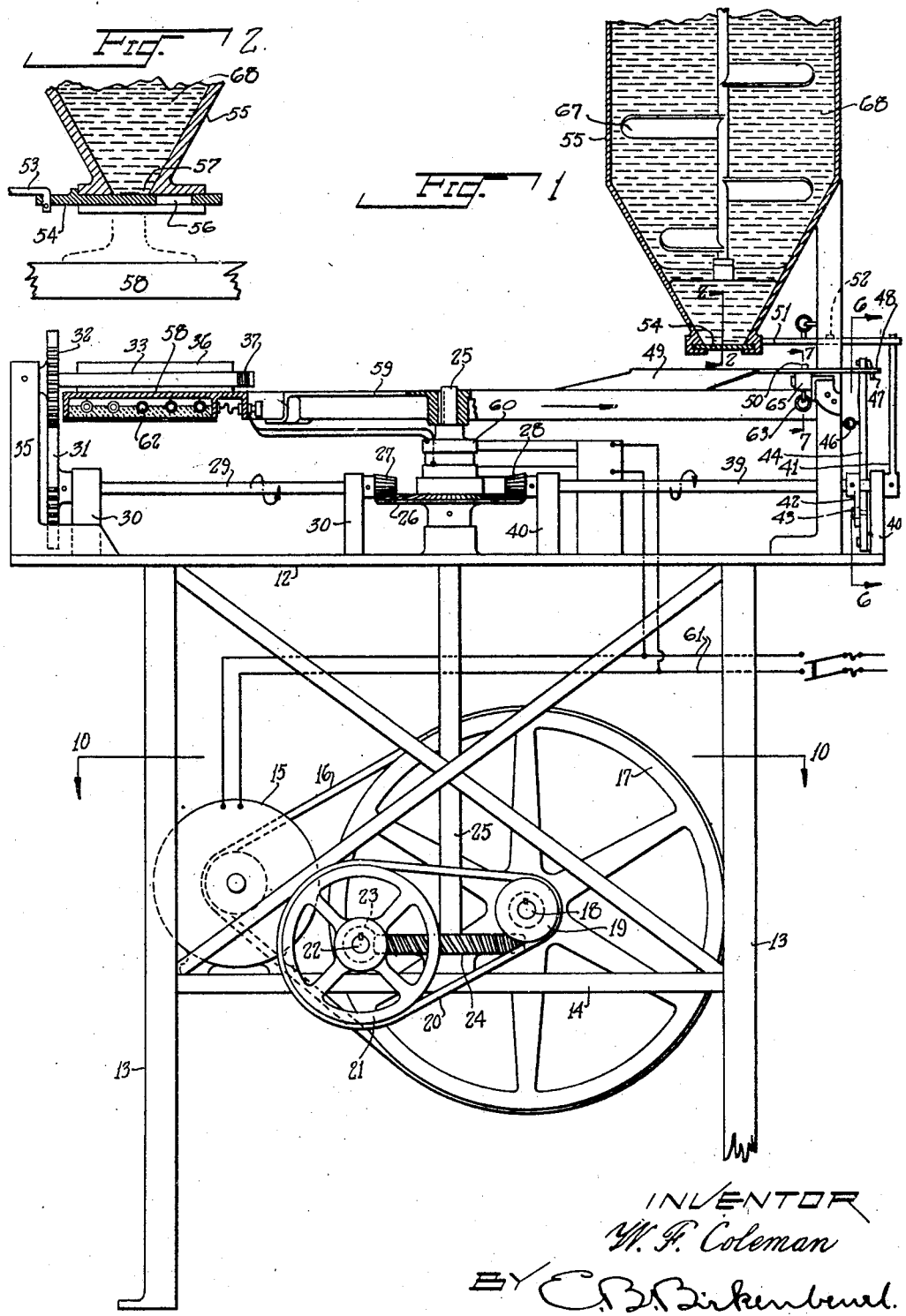

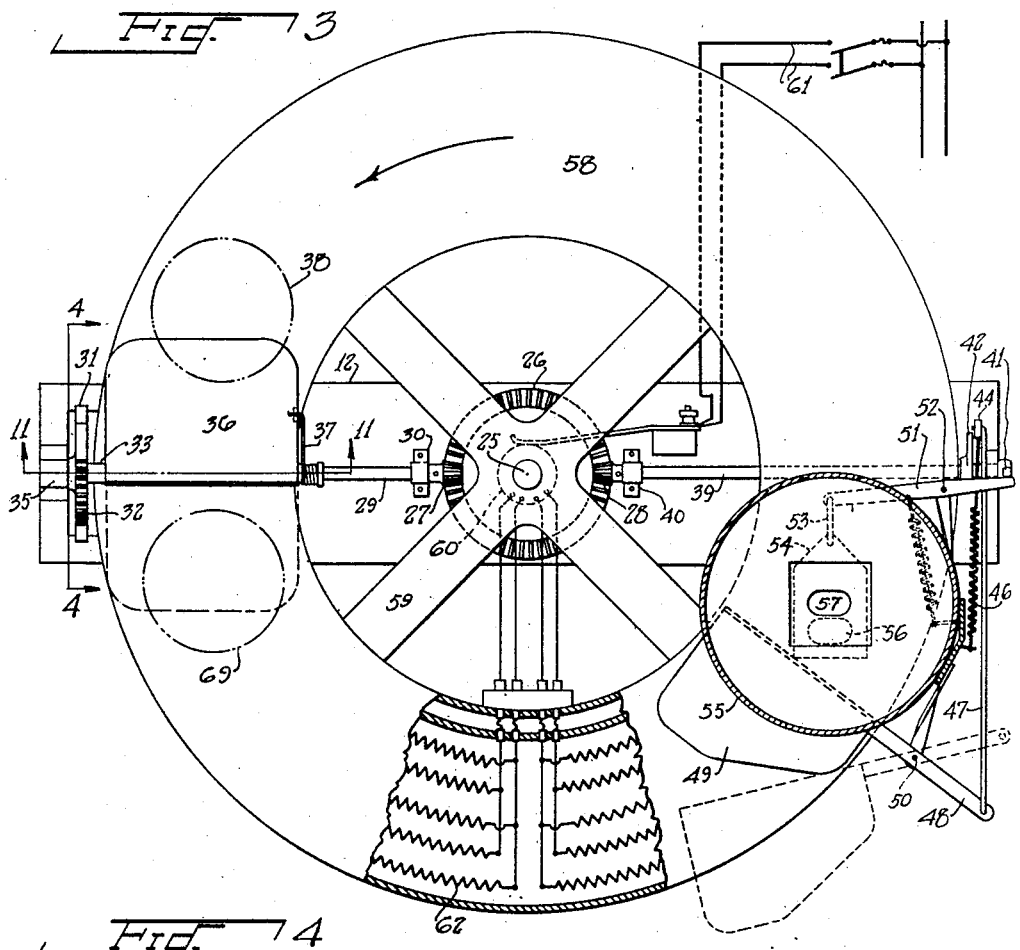
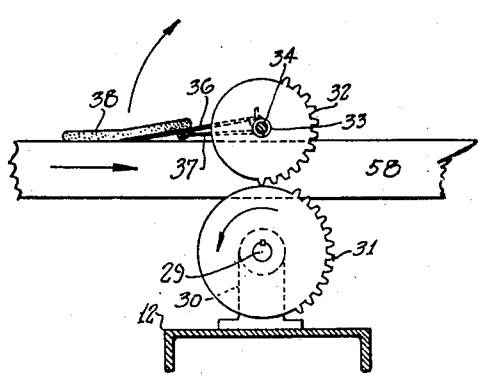
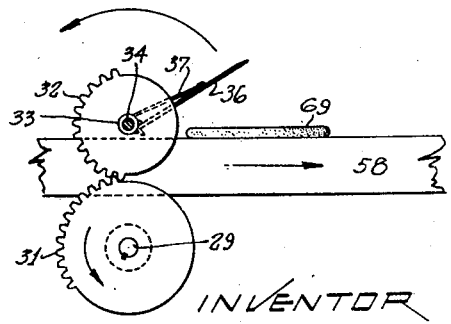

1,847,752

UNITED STATES PATENT OFFICE

WILLIAM F. COLEMAN, OF PORTLAND, OREGON, ASSIGNOR OF ONE-HALF TO RUDOLPH LAMPRECHT, OF PORTLAND, OREGON

HOT CAKE MACHINE

Application filed July 23, 1928. Serial No. 294,850.

This invention relates generally to machines for baking hot cakes and similar articles, and particularly to a machine for baking these cakes automatically.

The main object of this invention is to provide an automatic hot cake machine which will uniformly and suitably bake cakes in succession.

The second object is to eliminate the amount of time and hand labor ordinarily required in eating places for the baking of hot cakes, and to improve the quality of the cakes thus made.

And it is generally an object of the invention to provide a machine which is simple in design, structure and operation and economical to manufacture and operate. In accomplishing my objects I utilize a relatively movable (preferably rotatable) hot plate, an automatic batter depositor, and a simple form of cake manipulating means. Such manipulating means, in the specific form of a cake turner or ejector, comprises essentially a blade riding the hot plate at an acute angle and intermittently movable to move the cake which has ridden up onto it. Such a cake manipulator lends itself most efficiently, in combination with the relatively movable table, to the simple and effective accomplishment of the objects of this invention.

These, and other objects and accomplishments, will become more apparent from the specification following as illustrated in the accompanying drawings, in which:

Figure 1 is a side elevation of the machine with the upper portion thereof broken away in section. Figure 2 is a vertical section taken along the line 2—2 in Figure 1. Figure 3 is a plan view of the machine with a portion broken away to disclose the heating element. Figure 4 is a vertical section taken along the line 4—4 in Figure 3, showing the cake just prior to turning. Figure 5 is similar to Figure 4, but showing the cake just after it has been turned. Figure 6 is a vertical section taken along the line 6—6 in Figure 1. Figure 7 is a vertical section taken along the line 7—7 in Figure 1. Figure 8 is a side elevation of the cake removing blade just prior to the removal of the cake. Figure 9 is a similar view showing the cake removed from the heating table. Figure 10 is a horizontal section taken along the line 10—10 in Figure 1. Figure 11 is a vertical section taken along the line 11—11 in Figure 3.

Similar numbers of reference refer to similar parts throughout the several views.

Referring in detail to the drawings, there is shown a table 12 supported by the legs 13 which also carry the shelf 14 on which is mounted a motor 15 which through the belt 16 drives a large pulley 17 on whose shaft 18 is secured a small pulley 19 whose belt 20 drives a pulley 21 on the shaft 22. On the shaft 22 is secured a worm 23 which meshes with the worm wheel 24 on the vertical shaft 25. The table with its legs and other parts constitute the frame of my machine as here shown, which frame may be however constructed in any design suitable for supporting the operating parts.

The upper end of the shaft 25 projects through the table 12 and has mounted thereon a bevel gear 26 which meshes with the opposite pinions 27 and 28. The pinion 27 is carried by a shaft 29 which journals in the bearings 30 which are mounted on the table 12. On the end of the shaft 29 is secured an intermittent gear 31 which meshes with an intermittent pinion 32 which is mounted on a tube 33 which in turn is rotatably mounted on a spindle 34 which is pinned to the standard 35. To the tube 33 is secured the cake turning blade 36, between which blade and the spindle 34 is interposed a spring 37 for the purpose of returning the blade 36 to its normal plate-riding and scraping position after it has turned the cake 38 under the action of the pinion 32.

The pinion 28 is mounted on a shaft 39 which is carried by the bearings 40, on whose outer ends are secured an arm 41 and a cam 42. The cam 42 can engage the roller 43 on the lever 44 which is mounted on the bracket 45. The lever 44 is urged toward the cam 42 by means of the spring 46. At the top of the member 44 is attached a connecting rod 47 which is connected to the arm 48 of the cake removing blade 49 which is pivotally mounted on the pin 50. The arm 41 sweeps past the lever 51 which is mounted on the pivot 52 and has attached to one end a link 53 which is attached to the gate 54 of the container 55. The gate 54 is preferably in the form of a perforated slide having a somewhat elongated opening 56 formed therein which can register with an opening 57 in the bottom of the container 55 when the gate 54 is pulled out.

Under the turning blade 36 and the removing blade 49 is mounted a hot plate 58 in the form of a ring supported by a spoked center 59 which is mounted on the uppermost end of the shaft 25. On the shaft 25 are also mounted contact rings 60 by means of which current is carried from the wires 61 to the heating element 62 which is mounted on the under side of the rotating hot plate 58.

While the cake removing blade 49 is swung horizontally on its pivot 50 by means of the spring 46 and the action of cam 42, it is urged to bear against the top of the hot plate 58 by means of a spring 63 which is attached to a projecting arm 64 on the rotatable member 65 on which the pivot 50 is formed. The member 65 is itself mounted on a horizontal pivot 66 providing for the desired horizontal motion. Thus the removing blade is spring pressed into its plate scraping position, and during its horizontal cake removing motion. It is also desirable to provide a batter agitator 67 within the container 55 for the purpose of keeping the batter 68 in suitable condition. This agitator may be manually operated or power driven by any convenient connecting mechanism not shown.

The operation of the machine is as follows: Batter 68 is placed within the container 55 and after heat has been supplied to the hot plate 58 a sufficient length of time to secure the desired temperature, the machine is started. The first thing which takes place is a momentary opening of the gate 54 which allows a small amount of batter to fall upon the hot plate 58 which is now rotating in a counter-clockwise direction as shown in Figure 3. By the time the cake 38 has reached the position shown in Figures 3 and 4, it is ready to turn and it encounters the turning blade 36 and it rides up thereon just at the moment the shaft 39 is turned over by the intermittent gears 31 and 32. The turned cake 69 is again deposited on the hot plate 58 and is carried on until it reaches and rides upon the removing blade 49, which then under the action of the cam 42 gently but positively scrapes the complete baked cake 70 from the hot plate 58 and deposits it on the dish 71.

For the purpose of making the explanation more clear only three positions of the cake have been shown, namely, cake 38 which is half-baked, the cake 69 which has just been turned and the cake 70 which is just being removed from the machine.

While I have illustrated this machine in a somewhat open form with the parts more or less exposed, this has been done merely for the purpose of convenience and better illustrating the operation of the machine. For public use it would be preferable to completely inclose the work parts as far as possible, as well as to condense them as is well in the range of the ordinary mechanic.

I claim:

1. A hot cake machine having in combination a relatively movable smooth-topped hot plate, a turning blade riding over the surface of the hot plate, a cake removing blade riding over the surface of the hot plate, and means for causing relative movement of the hot plate with reference to the turning and removing blades.

2. A hot cake machine having in combination a relatively movable smooth-topped hot plate, a pivoted turning blade riding over the surface of the hot plate, a movable removing blade riding over the surface of the hot plate, means for causing relative movement of the hot plate with reference to the turning and removing blades, and means to invert the turning blade and to move the removing blade in timed relation with the relative movement of the hot plate.

3. A hot cake machine having in combination a relatively movable smooth-topped hot plate, means for intermittently depositing batches of batter on the hot plate, a cake turning blade mounted on a relatively stationary support, riding over the top of the hot plate, and movable to an inverted position, and a cake removing blade mounted on a relatively stationary support, riding over the top of the hot plate, and movable to remove baked cakes therefrom.

4. A hot cake machine having in combination a relatively movable smooth-topped hot plate, means for intermittently depositing batches of batter on the hot plate, a cake turning blade mounted on a relatively stationary support, riding over the top of the hot plate, and movable to an inverted position, and a cake removing blade mounted on a relatively stationary support, riding over the top of the hot plate, and movable in the plane of the hot plate to remove baked cakes therefrom.

5. A hot cake machine having in combination a relatively movable smooth-topped hot plate, means for intermittently depositing batches of batter at spaced positions on the plate during its relative movement, a movable cake manipulating blade riding at one of its edges on the plate and making an acute angle therewith so that a cake may ride up from the plate upon the blade, and means to move the blade intermittently in timed relation with the relative movement of the plate.

6. A hot cake machine having in combination a relatively movable smooth-topped hot plate, means for intermittently depositing batches of batter at spaced positions on the plate during its relative movement, a movable cake turning blade riding at one of its edges on the plate and making an acute angle therewith so that a cake may ride up from the plate upon the blade, and means to move the blade to a substantially inverted position and intermittently in timed relation with the relative movement of the plate.

7. A hot cake machine having in combination a relatively movable smooth-topped hot plate, means for intermittently depositing batches of batter at spaced positions on the plate during its relative movement, a movable cake removing blade riding at one of its edges on the plate and making an acute angle therewith so that a cake may ride up from the plate upon the blade, and means to move the blade in a direction substantially parallel with the plate and intermittently in timed relation with the relative movement of the plate.

8. A hot cake machine having in combination a flat, rotatable hot plate, means for rotating said hot plate, means for depositing measured quantities of batter on said hot plate at regular intervals, a turning blade mounted above said hot plate in the path of the cakes being baked thereon, said blade having one edge thereof riding on said hot plate in a manner to lift the cake from the plate as the cake advances, means for turning said blade when the cake is deposited thereon, a swinging cake removing blade also in the path of the moving cakes, and means for swinging said removing blade in a manner to remove a cake from said hot table.

9. A hot cake machine having in combination a rotatable hot plate, a batter dispensing container adapted to deposit measured quantities of batter on said hot plate at regularly spaced intervals, a turning blade coordinating with said dispensing device whereby each baking cake is turned on said hot plate, a cake removing blade mounted on said hot plate normally having one edge thereof resting thereon in the path of the baking cakes, and means for swinging said removing blade beyond the edge of said hot plate whenever a baked cake is placed thereon.

10. A hot cake machine having in combination a rotatable hot plate, a vertical shaft on which said hot plate is mounted, a bevel gear on said vertical shaft, a pair of meshing intermittent gears at one side of said hot plate having driving connections to said bevel gear, a turning blade on said hot plate, a spring interposed between said turning blade and the driven segment gear, a batter dispensing device mounted over said hot plate, a gate for controlling the flow of batter from said device, a lever for operating said gate, a shaft driven by said bevel gear, an arm on said shaft arranged to sweep said gate operating lever and operate same intermittently, a cake removing blade adapted to sweep across the top of said hot plate and to be inclined as it extends over the side of said hot plate and cam means on said shaft for actuating said cake removing blade.

11. A hot cake machine having a rotatable hot plate in combination with a rockably inclined cake turning blade mounted on a stationary pivot the lowermost end of the blade normally resting on the plate whereby a half-baked cake can be lifted from said hot plate, turned over and restored to said hot plate, a cake removing blade normally in the path of cakes moving on said hot plate having means for scraping same across said plate to intersect the path of the cakes whereby a baked cake is removed from said hot plate.

12. A hot cake machine having in combination a circular, flat, rotatable hot plate having a batter dispensing magazine mounted over same, a cake turning blade over said hot plate more than one-half of the circumference of the hot plate from said dispensing device in the direction of the travel of the hot plate, and a cake removing blade between said cake turning blade and said dispensing device.

13. A hot cake machine having in combination a relatively movable hot plate, a blade carrying shaft, a cake manipulating blade mounted at one edge on said shaft over said hot plate, said shaft extending transversely of the line of motion of said hot plate, said blade having its opposite free edge riding the plate top, and normally making an acute angle with the plate top, whereby a cake may ride up from the plate onto the blade, means for giving the plate movement with relation to the blade, such motion being transverse to the axis of said blade mounted shaft, and means for intermittently rotating the blade about the axis of its mounting shaft to periodically invert the blade in timed relation with the movement of the plate, whereby a cake which has ridden up into the blade is inverted and re-deposited on the plate.

14. A hot cake machine having in combination a relatively movable hot plate, a cake manipulating blade mounted at one edge on a shaft, having its opposite free edge riding the plate top, and normally making an acute angle with the plate top, whereby a cake may ride up from the plate onto the blade, means for giving the plate movement with relation to the blade, and means for intermittently rotating the blade about the axis of its mounting shaft to periodically invert the blade in timed relation with the movement of the plate, said last mentioned means including a spring which normally presses the blade against the plate.

15. A hot cake machine having in combination a relatively movable smooth-topped hot plate, a cake manipulating blade movably mounted above the plate and having an edge riding the plate top, the blade normally making an acute angle with the plate top whereby a cake may ride up from the plate onto the blade, means for giving the table movement relative to the blade, and means for moving the blade intermittently in timed relation with the table movement to move a cake which has ridden up onto it.

16. A hot cake machine having in combination a relatively movable smooth-topped hot plate, a cake manipulating blade riding at one of its edges on the hot plate and making an acute angle with the plate so that a cake may ride up from the plate onto the blade, a blade carrying arm, means to give the plate movement relative to the blade, and means for moving the blade, through its carrying arm, in a movement substantially parallel with the plate.

17. A hot cake machine having in combination a relatively movable smooth-topped hot plate, a cake manipulating blade riding at one of its edges on the hot plate and making an acute angle with the plate so that a cake may ride up from the plate onto the blade, a blade carrying arm mounted to swing in a plane substantially parallel with the plate, means to give the plate movement relative to the blade, and means for swinging the arm to move the blade over the plate in a scraping action.

18. A hot cake machine having in combination a relatively movable smooth-topped hot plate, a cake manipulating blade riding at one of its edges on the hot plate and making an acute angle with the plate so that a cake may ride up from the plate onto the blade, a blade carrying arm, means to give the plate movement relative to the blade, and means for intermittently moving the blade, through its carrying arm, in a movement substantially parallel with the plate, and in timed relation to the relative movement of the plate.

19. A hot cake machine having in combination a relatively movable smooth-topped hot plate, a cake manipulating blade riding at one of its edges on the hot plate and making an acute angle with the plate so that a cake may ride up from the plate onto the blade, a blade carrying arm, means to give the plate movement relative to the blade, means for moving the blade, through its carrying arm, in a movement substantially parallel with the plate, and springing means tending to rotate the blade to press its riding edge into plate contact.

20. A hot cake machine having in combination a relatively movable smooth-topped hot plate, a cake manipulating blade riding at one of its edges on the hot plate and making an acute angle with the plate so that a cake may ride up from the plate onto the blade, a blade carrying arm mounted to swing in a plane substantially parallel with the plate, means to give the plate movement relative to the blade, means for swinging the arm to move the blade over the plate in a scraping action, and springing means tending to rotate the blade about its swinging carrier arm to press its riding edge into plate contact.

21. A hot cake machine having in combination a relatively movable hot plate, a cake manipulating blade riding at one of its edges on the plate and normally making an acute scraping angle with the plate, a blade carrying shaft located above the plate and substantially parallel therewith, means for intermittently rocking the blade about the shaft axis to a substantially inverted position, and a spring acting to return the blade to its normal plate riding position and to press its edge against the plate.

WILLIAM F. COLEMAN.

CERTIFICATE OF CORRECTION.

Patent No. 1,847,752.                                  Granted March 1, 1932, to

WILLIAM F. COLEMAN.

It is hereby certified that error appears in the printed specification of the above numbered patent requiring correction as follows: Page 3, line 104, claim 13, for the word "mounted" read mounting; and that the said Letters Patent should be read with this correction therein that the same may conform to the record of the case in the Patent Office.

Signed and sealed this 26th day of April, A. D. 1932.

(Seal)                                            M. J. Moore,
                                                   Acting Commissioner of Patents.